United States Patent [19]

Alger

[11] Patent Number: 4,608,105
[45] Date of Patent: Aug. 26, 1986

[54] PROCESS FOR MANUFACTURING 3-D GLASSES

[75] Inventor: Stanton W. Alger, Monrovia, Calif.

[73] Assignee: 3D Video Corporation, North Hollywood, Calif.

[21] Appl. No.: 512,166

[22] Filed: Jul. 8, 1983

[51] Int. Cl.⁴ ........................ B32B 31/10; B32B 31/18
[52] U.S. Cl. ..................................... 156/108; 156/250; 156/256; 156/514; 156/552
[58] Field of Search ........... 156/256, 293, 300, 303.1, 156/250, 265, 514, 519, 539, 552, 108; 40/158 B, 158 R

[56] References Cited

U.S. PATENT DOCUMENTS

| | | | |
|---|---|---|---|
| 2,289,336 | 7/1942 | Bamford | 156/514 |
| 2,294,159 | 8/1942 | Calabro | 156/108 |
| 2,565,367 | 8/1951 | Greenhelgh et al. | 156/108 |
| 3,536,555 | 10/1970 | Thompson | 156/514 |
| 3,873,405 | 3/1975 | Wilkes | 156/514 |

Primary Examiner—Caleb Weston
Attorney, Agent, or Firm—Lyon & Lyon

[57] ABSTRACT

A plurality of pairs of 3-D glasses are manufactured by an apparatus having a movable work place according to a process in which individual left and right eye lenses are placed on a strip of material having an adhesive back which is then laminated to a sheet of frame material to form a composite sheet from which the plurality of 3-D glasses are cut.

13 Claims, 5 Drawing Figures

PROCESS FOR MANUFACTURING 3-D GLASSES

BACKGROUND OF THE INVENTION

The field of the present invention relates generally to the manufacture of 3-D glasses.

Three-dimensional movies made their first appearance in movie theaters in the 1950's. When such movies were introduced, patrons of the theaters were given special glasses which would create a three-dimensional viewing effect, and these glasses came to be known as "3-D glasses" within the industry. Since the early introduction of 3-D glasses, the process by which a three-dimensional viewing effect is achieved has undergone several changes. However, despite these changes, the term "3-D glasses" still remains in use and the term connotes glasses which are used to view specially prepared printed materials, films and the like. When a person wears a pair of these glasses, the pair of lenses will interact with the specially prepared materials to give the appearance of a three-dimensional effect.

3-D glasses today are typically constructed of a cardboard frame which houses two lenses. The lenses in at least some of the existing processes are made from a material which shifts the field of polarization of the viewer's eye. The major expense associated with the cost of such 3-D glasses is the lens material, the labor required to produce the glasses being another major expense.

At the present time, 3-D glasses are manufactured by taking pre-printed sheets or stiff cardboard, typically 10 to 12 point, die-cutting these sheets for the eyeholes, applying glue to one of the sheets, laying on two strips of lens material cut at 45° from a roll of lens material, laying the two strips of lens material which shift polarized planes of light at opposite angles on one of the sheets and then laminating the two sheets together. These sheets are then die-cut into a final form.

The final shape of the eye openings in the glasses of the prior art tends to be rectangular since the lens material applied to the cardboard will be in the shape of a long rectangular strip. However, there is considerable waste in this system; especially in the lens material. Initially, the rectangular lens shape does not conform to the shape of the human eye, so excess material in the rectangular corners will be wasted. Further, the rectangular sections of lens material which are formed between pairs of glasses by die cutting the strip to form the glasses are not utilized. Accordingly, when the square lens eye openings, the rectangular tabs leftover between the die-cut glasses and the extra border required for gluing and cementing the lens material in place are taken into account, up to 35% of the lens material will be wasted. And since the major expense in the cost of a pair of 3-D glasses is the lens material, such a large percentage of waste significantly contributes to the overall cost of a pair of 3-D glasses.

Accordingly, there exists a need to reduce the waste consumption of lens material utilized in the manufacture of 3-D glasses. Additionally, there also exists a need to reduce the cost of the manufacture of 3-D glasses by reducing or eliminating the labor intensive steps utilized in current manufacturing processes.

SUMMARY OF THE INVENTION

In the present invention, 3-D glasses are manufactured by positioning individual lenses on an adhesive back of a sheet of material between the cardboard frame. In another aspect of the present invention, the eye opening for a lens in a pair of 3-D glasses is reduced to a more efficient size to reduce waste of lens material.

In the present invention, 3-D glasses are constructed from a sheet of frame material and a strip of material having an adhesive back which are die-cut for lens openings before the lenses are installed. The lenses are then cut from sheets or films of lens material in a shape which reduces excess borders which overlap the cardboard sheet to hold the lenses in place. In addition, the eye opening is reduced to avoid excess waste in the opening and therefore the corresponding border as well.

A strip of material having an adhesive back is placed on a rotatable device or conveyor. The strip of material is then transferred to a second station at which the pre-cut lenses are aligned. In the next stage, a sheet of frame material is positioned over the lenses and the sheet of frame material and the strip of material having an adhesive back are laminated together to form a composite sheet while individual pairs of glasses are die-cut and removed from the composite sheet.

In the present invention, the positioning of the lens material reduces the excess waste border while eliminating the need for the utilization of a long strip of lens material.

Additionally, since the left and the right lens are cut as different shapes, no inadvertent mixing of a left and a right lens will occur. This avoids waste of materials in that a pair of glasses with two left lenses or two right lenses will not create a three-dimensional effect.

The present invention also reduces the amount of labor required to produce a pair of 3-D glasses by providing a simplified process which may be automated on an apparatus according to the present invention.

Accordingly, it is the primary object of the present invention to provide a process and an apparatus for the manufacture of improved 3-D glasses.

This and further objects and advantages will be apparent to those skilled in the art in connection with the drawings and the detailed description of the preferred embodiment set forth below.

DETAILED DESCRIPTION OF THE DRAWINGS

Figure 1:
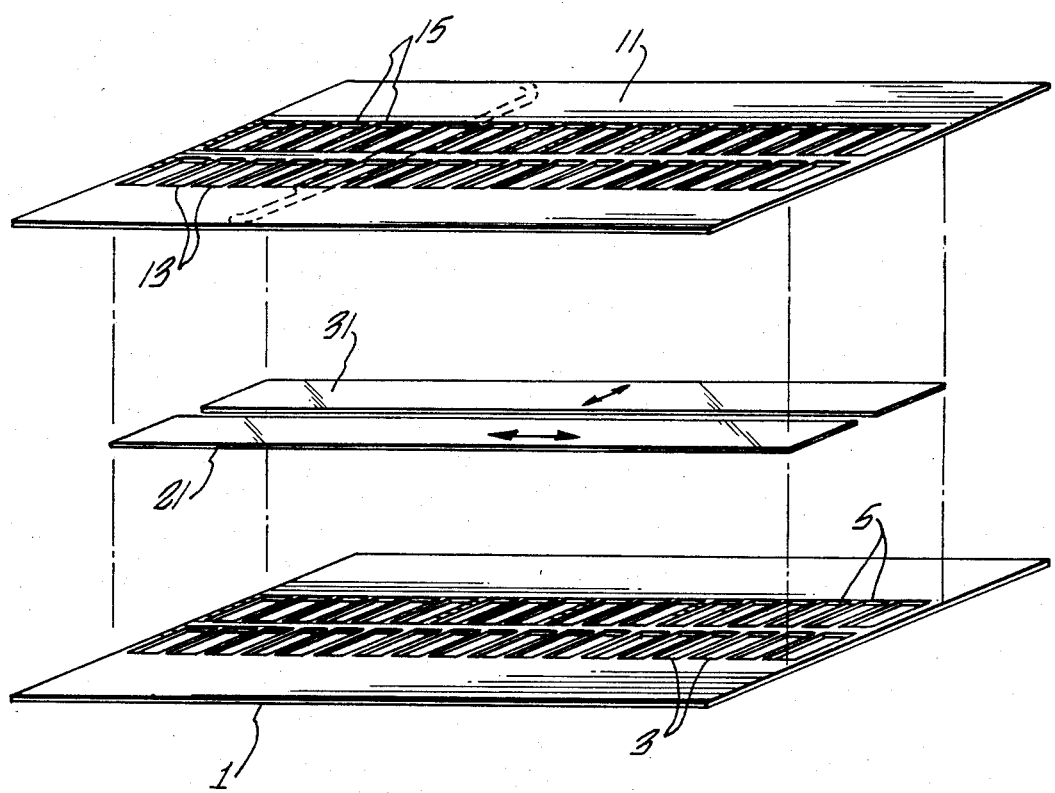
FIG. 1 is an exploded view of a composite sheet of 3-D glasses during their manufacture according to the prior art.

In a process according to the prior art, a composite sheet of 3-D glasses, an exploded view of which is depicted in FIG. 1, was produced from a bottom sheet 1, a top sheet 11, a strip of left lens material 21 and a strip of right lens material 31. The bottom sheet 1 and top sheet 11 were die-cut for the plurality of left eyeholes 3 and 13, respectively, and the plurality of right eyeholes 5 and 15, respectively. After the die-cutting, either the bottom sheet 1 or the top sheet 13 received a coating of glue on top of which the strip of left lens material 21 and the strip of right lens material 31 were laid. The bottom sheet 1 and the top sheet 13 were then laminated together and the 3-D glasses were die-cut from the composite sheet.

Figure 2:
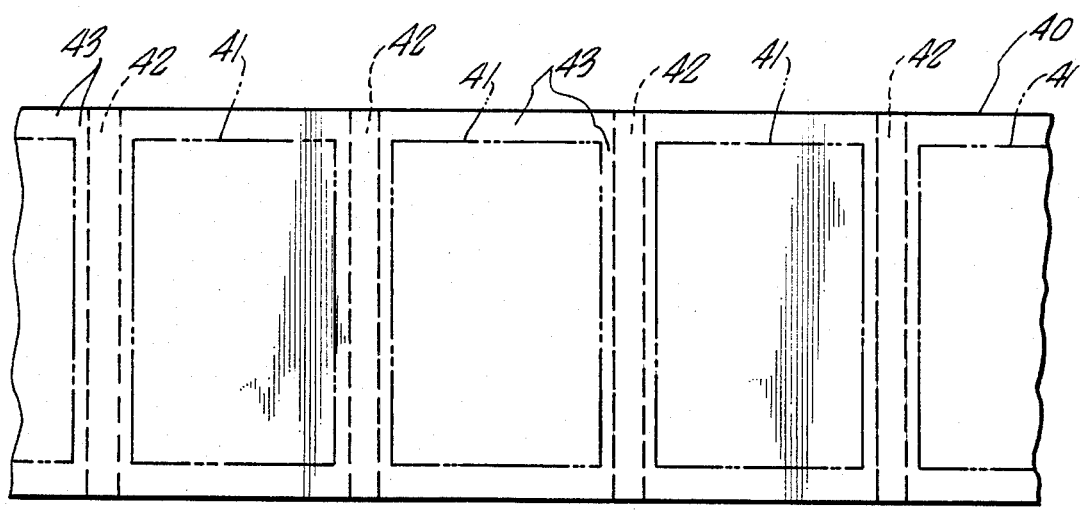
FIG. 2 is a plan view of a strip of lens material utilized in the manufacture of 3-D glasses according to the prior art.

In FIG. 2, a strip of lens material 40, used in the prior art, is shown. When the 3-D glasses are cut from the strip 40, the areas 41 will form lenses in the 3-D glasses. However, since there will always be at least some gap 42 between the patterns of two adjacent 3-D glasses cut from the composite sheet of 3-D glasses, all of the lens material contained in the gaps 42 will be wasted. Additionally, a large portion of the border areas 43 which are utilized to glue the lenses 41 to the cardboard sheets 1 and 11 will also be wasted. When the gaps 42 and borders 43 are taken into account, it has been found that there can be as much as 35% to 40% waste in the utilization of the strip of lens material 40.

Figure 3:
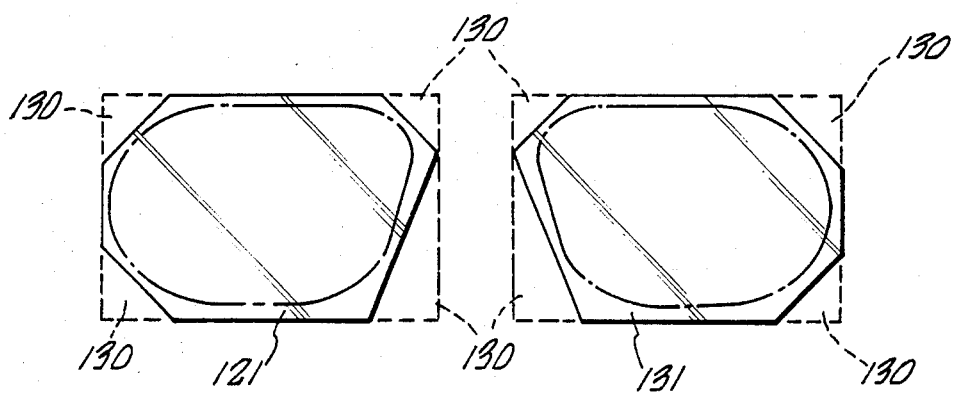
FIG. 3 is a plan view of an eye lens according to the present invention.
Figure 5:
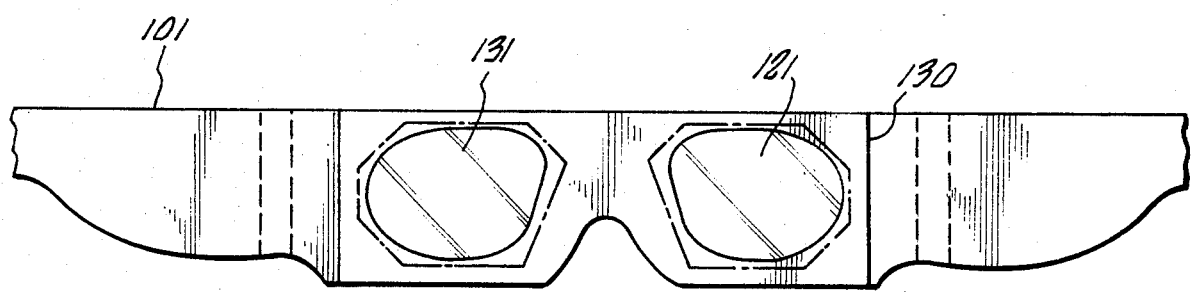
FIG. 5 is a plan view of a pair of 3-D glasses according to the present invention.
Figure 4:
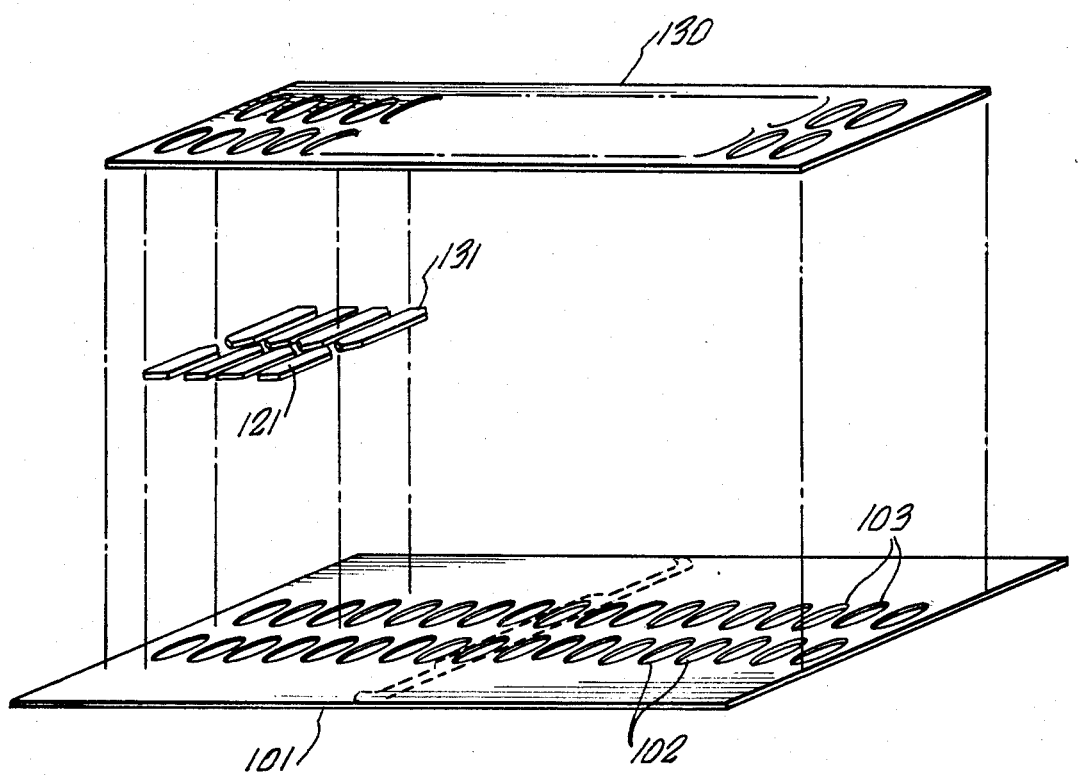
FIG. 4 is an exploded view of a composite sheet of 3-D glasses during their manufacture according to the present invention.

In FIG. 3, a left lens 121 and a right lens 131 according to the present invention are depicted. In these lenses, the borders have been shaped so as to reduce waste of material which would occur had a rectangular lens been utilized. Thus, the corner portions 130 are no longer included in the manufacture of a pair of 3-D glasses and the border area comprises substantially 3% or less of the area of the lenses. In addition, the left lens 121 and the right lens 131 are cut in an irregular multi-edged shape of at least six sides capable of forming a mirror image. Thus, the left lens 121 and the right lens 131 are visually distinguishable and will only fit in a magazine designed for one of the two corresponding mirror images. Although the preferred embodiment has been described as having mirror images, it would be apparent to one skilled in the art that the left lens 121 and the right lens 131 could be cut in different shapes which were not mirror images without departing from the scope of the present invention. In addition, the number of sides of the left lens 121 and the right lens 131 can be varied.

In the process of the present invention, a strip of material 101 having an adhesive back 107 is die-cut to contain a plurality of left eye openings 102 and a plurality of right eye openings 103. The strip of material 101, which may be made of paper, cardboard or any one of a number of suitable materials, may be placed upon a movable work place such as a conveyor or a turntable, at a first station.

In the second step of the process of the present invention, which may be accomplished at a second station of a machine according to the present invention, the plurality of left lenses 121 and the plurality of right lenses 131 are placed on the adhesive back 107 of the strip of material 101 by a lens placement means so as to align the plurality of left lenses 121 and the plurality of right lenses 131 with the plurality of left eye openings 102 and the plurality of right eye openings 103, respectively.

In the next step of the process, which may be accomplished at a third work station, a sheet of frame material 111, which may be cardboard, having a plurality of left eye openings 112 and a plurality of right eye openings 113 is placed on top of the adhesive back 107 by a frame placement means. The sheet of frame material 111 is then laminated to the strip of material 101 by a press to form a composite sheet, the plurality of left lenses 121 being aligned with the plurality of left eye openings 102 and 112 while the plurality of right lenses 131 are aligned with the plurality of right eye openings 103 and 113. A plurality of 3-D glasses are then die-cut from the composite sheet and may be removed in a fourth station.

In order to further illustrate the process and apparatus of the present invention, an example of the process and apparatus are set forth below. In this example, the apparatus has a turntable designed to rotate in substantially 90° portions so as to form four work stations. In the first work station, the strip of material 101 is placed on the turntable at a first station by a positioning means. The turntable is then rotated substantially 90° whereupon at station two vacuum cups pick up 18 left eye lenses 121 and 18 right eye lenses 131 from magazines and press them onto the adhesive back 107. Each of the left eye lenses 121 and the right eye lenses 131 have seven sides and the left eye lenses 121 are mirror images of the right eye lenses 131. After the lenses have been placed on adhesive back 107, the turntable is rotated substantially 90° to station three where a sheet of frame material 111 is dropped onto the adhesive back 107 and then laminated to the strip of material 101 by a press. After lamination, 18 pairs of 3-D glasses are die-cut from the composite sheet by a cutter. The turntable is then rotated substantially 90° and the completed glasses are removed from the turntable by a removal means. At this point, the turntable is rotated substantially 90° and the process repeats.

Having fully described the present invention, it will be apparent from the above description and drawings that various modifications may be made within the scope of the present invention without departing from the inventive concept disclosed herein. Thus, for example, instead of a turntable, an apparatus according to the present invention could be automated by the means of a conveyor system or the like. In addition, it should be apparent to one skilled in the art that many devices, such as mechanical arms and the like, may be used as a positioning means or a removal means. Therefore, the present invention is not intended to be limited except as may be required by the lawful scope of the following claims.

What is claimed is:

1. An apparatus for manufacturing a plurality of 3-D glasses having a movable work surface, said apparatus comprising:

a turntable having the movable work surface which rotates substantially 90° between a first and a second work station;

a lens placement means for placing a plurality of eye lenses over a first plurality of eye openings formed in a strip of material having an adhesive surface such that each of the plurality of lenses has a border area which contacts the adhesive surface, said lens placement means being located at the first work station located on the turntable;

a frame placement means for placing a sheet of frame material having a second plurality of eye openings on top of the adhesive surface such that the plurality of eye lenses are held between the first plurality of eye openings and the second plurality of eye openings;

a press for laminating the sheet of frame material to the strip of material to form a composite sheet; and a cutter for cutting a plurality of 3-D glasses from the composite sheet, the frame placement means, the press and said cutter being located at a second work station such that the movable work surface must move between the first and the second work station during manufacture of the plurality of 3-D glasses.

2. An apparatus as recited in claim 1 wherein the lens placement means comprises a plurality of vacuum cups which pick up the plurality of lenses from a plurality of magazines and press the plurality of lenses onto the adhesive surface.

3. An apparatus as recited in claim 1 wherein the frame placement means drops the sheet of frame material onto the adhesive surface.

4. An apparatus as recited in claim 1 further comprising a removal means for removing the composite sheet and the plurality of 3-D glasses from the work surface, said removal means being located at a third work station such that the turntable rotates substantially 90° between the second and the third work stations.

5. An apparatus as recited in claim 4 further comprising a positioning means which places the strip of material on the work surface, said positioning means being located at a fourth work station such that the turntable rotates substantially 90° between the third and the fourth work stations and substantially 90° between the fourth and the first work stations.

6. A process for manufacturing 3-D glasses, said process comprising the steps of:

placing a plurality of eye lenses over a first plurality of eye openings formed in a strip of material having an adhesive surface such that each of the plurality of lenses has a border area which contacts the adhesive surface, said placement occurring on a first work station located near a movable work surface on a turntable which rotates substantially 90° between the first work station and a second work station;

rotating the movable work surface from the first work station to the second work station;

placing a sheet of frame material having a second plurality of eye openings on top of the adhesive surface such that the plurality of eye lenses are held between the first plurality of eye openings and the second plurality of eye openings;

laminating the sheet of frame material to the strip of material to form a composite sheet; and cutting a plurality of 3-D glasses from the composite sheet.

7. A process as recited in claim 6, further comprising the steps of rotating the movable work surface to a third work station such that the turntable rotates substantially 90° between the second and the third work stations; and removing the composite sheet and the plurality of 3-D glasses from the work surface.

8. A process for manufacturing 3-D glasses, said process comprising the steps of:

(1) placing a strip of material having an adhesive surface on a movable work surface of a turntable at a first work station;

(2) rotating the work surface substantially 90° between the first work station and a second work station;

(3) placing a plurality of eye lenses over a first plurality of eye openings formed in the strip of material such that each of the plurality of lenses has a border area which contacts the adhesive surface;

(4) rotating the work surface substantially 90° between the second work station and a third work station;

(5) placing a sheet of frame material having a second plurality of eye openings on top of the adhesive surface such that the plurality of eye lenses are held between the first plurality of eye openings and the second plurality of eye openings;

(6) laminating the sheet of frame material to the strip of material to form a composite sheet; and (7) cutting a plurality of 3-D glasses from the composite sheet.

9. A process as recited in claim 8 further comprising the steps of:

(8) rotating the work surface substantially 90° between the third work station and a fourth work station; and (9) removing the plurality of 3-D glasses from the work surface.

10. A process as recited in claim 9 comprising the further step of:

(10) rotating the work surface substantially 90° between the fourth work station and the first work station.

11. A process as recited in claim 10 wherein steps (1) through (10) are repeated.

12. A process as recited in claim 8 wherein the border area of each of the plurality of eye lenses which contacts the adhesive surface comprises less than substantially three percent (3%) of the area of each of said plurality of eye lenses.

13. A process as recited in claim 12 wherein each of the plurality of eye lenses has at least six sides.

* * * * *